(12) United States Patent
Yang

(10) Patent No.: US 11,948,155 B2
(45) Date of Patent: Apr. 2, 2024

(54) METHOD AND DEVICE FOR PERFORMING CREDIT EVALUATION ON WORK PUBLISHER ON BASIS OF BLOCKCHAIN

(71) Applicant: Advanced New Technologies Co., Ltd., Grand Cayman (KY)

(72) Inventor: Xinying Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 387 days.

(21) Appl. No.: 17/254,159

(22) PCT Filed: Apr. 16, 2019

(86) PCT No.: PCT/CN2019/082902
§ 371 (c)(1),
(2) Date: Dec. 18, 2020

(87) PCT Pub. No.: WO2020/015405
PCT Pub. Date: Jan. 23, 2020

(65) Prior Publication Data
US 2021/0272132 A1    Sep. 2, 2021

(30) Foreign Application Priority Data

Jul. 18, 2018 (CN) .................. 2201810793076.2

(51) Int. Cl.
*G06Q 30/018* (2023.01)
*G06Q 50/18* (2012.01)
(52) U.S. Cl.
CPC ......... *G06Q 30/018* (2013.01); *G06Q 50/184* (2013.01); *G06Q 2220/16* (2013.01)
(58) Field of Classification Search
None
See application file for complete search history.

(56) References Cited

U.S. PATENT DOCUMENTS 10,135,834 B1    11/2018 Galebach
10,915,891 B1    2/2021 Winklevoss
(Continued)

FOREIGN PATENT DOCUMENTS

| CA | 2948241 A1 * | 5/2017 | ............ G06F 21/62 |
| CN | 107086920 A  | 8/2017 | |
| CN | 110324362 A * | 10/2019 | ......... H04L 63/1425 |

OTHER PUBLICATIONS

D. Roman and G. Stefano, "Towards a Reference Architecture for Trusted Data Marketplaces: The Credit Scoring Perspective," 2016 2nd International Conference on Open and Big Data (OBD), Vienna, Austria, 2016, pp. 95-101, doi: 10.1109/OBD.2016.21. (Year: 2016).*

(Continued)

*Primary Examiner* — Michael Young
(74) *Attorney, Agent, or Firm* — Seed IP Law Group LLP

(57) ABSTRACT

Disclosed are a method and device for performing credit evaluation on a work publisher on the basis of a blockchain. The method and device can perform originality analysis on a target work published by a target service node to the blockchain so as to obtain an originality representation value corresponding to the target work. If the originality representation value is low, a copyright credit score corresponding to the target service node is deducted. The deduction is subjected to consensus verification performed by a plurality of service nodes and can only be made public in the blockchain after the consensus verification is successful. The blockchain can publicize a copyright credit score deduction record corresponding to the target service node, based on which the copyright credit score corresponding to the target service node can be determined. The lower the copyright credit score, the poorer the credit level of the target service node.

27 Claims, 4 Drawing Sheets

(56) References Cited

U.S. PATENT DOCUMENTS

| | | |
|---|---|---|
| 2004/0024750 A1 | 2/2004 | Ulyanov |
| 2014/0245004 A1 | 8/2014 | Houston |
| 2015/0302886 A1* | 10/2015 | Brock ................ H04N 21/2743 726/32 |
| 2017/0046652 A1* | 2/2017 | Haldenby ............. G06F 21/645 |
| 2018/0294966 A1 | 10/2018 | Hyun |
| 2019/0026826 A1* | 1/2019 | Chebrole ............... G06Q 40/03 |
| 2019/0163912 A1 | 5/2019 | Kumar |
| 2019/0325473 A1 | 10/2019 | Swamidurai |
| 2019/0385215 A1 | 12/2019 | Ferenczi |
| 2020/0128022 A1 | 4/2020 | Bleikertz |
| 2020/0193432 A1 | 6/2020 | Millar |

OTHER PUBLICATIONS

Boixo, S. et al. "Simulation of low-depth quantum circuits as complex undirected graphical models". Jan. 2018, [online], [retrieved on Aug. 28, 2019]. https://arxiv.org/pdf/1712.05384.pdf.

Zhang et al., "A Design of Digital Rights Management Mechanism Based on Blockchain Technology," Research Institute of Information Technology, Tsinghua University, Beijing, China, 2018, (pp. 32-46) 15 pages.

* cited by examiner

METHOD AND DEVICE FOR PERFORMING CREDIT EVALUATION ON WORK PUBLISHER ON BASIS OF BLOCKCHAIN

CROSS-REFERENCE TO RELATED APPLICATIONS

This application claims priority to Chinese Patent Application No. 201810793076.2, filed on Jul. 18, 2018 and entitled "METHOD AND DEVICE FOR PERFORMING CREDIT EVALUATION ON WORK PUBLISHER ON BASIS OF BLOCKCHAIN," which is incorporated herein by reference in its entirety.

TECHNICAL FIELD

The present application relates to the technical field of information, and in particular to a method and device for performing credit evaluation on a work publisher on the basis of a blockchain.

BACKGROUND

In the field of copyright protection, a credit evaluation mechanism may be introduced in order to punish plagiarism of works. A work plagiarism act committed by a person will directly affect the credit evaluation thereof.

In practice, people engaged in work creation may register as users in advance on a server of a copyright credit evaluator (usually associations of copyright-related industry, large enterprises in copyright-related industry, or the like). When the server detects that a work published by a user is suspected of plagiarism, the server will lower a stored copyright credit score corresponding to the user.

However, in the field of copyright protection, a more open and credible credit evaluation method for work publishers is needed.

SUMMARY

In order to solve the problem in which the existing method of performing credit evaluation on work publishers is not open and credible enough, the present application provides a blockchain-based method and device for performing credit evaluation on a work publisher. The technical solution is as follows:

According to the first aspect of the present application, provided is a method of performing credit evaluation on a work publisher on the basis of a blockchain, a blockchain network comprising a plurality of service nodes, each service node having permission to publish works to the blockchain, and the method comprising:
  performing originality analysis, according to published works in the blockchain, on a target work published by a target service node to the blockchain, so as to obtain an originality representation value corresponding to the target work, the target service node being any service node, the originality representation value being positively correlated with a degree of originality of the target work;
  if the originality representation value is less than a first specified threshold, determining a copyright credit score decrement according to the originality representation value;
  constructing a credit deduction transfer on the basis of a node identifier of the target service node and the copyright credit score decrement;
  broadcasting the credit deduction transfer to the blockchain network, such that a plurality of service nodes in the blockchain network, upon successful consensus verification of the credit deduction transfer, establish a corresponding relationship between the node identifier and the copyright credit score decrement and store the corresponding relationship in the blockchain;
  wherein a copyright credit score corresponding to the target service node is positively correlated with credit evaluation of a user corresponding to the target service node.

According to the second aspect of the present application, provided is a device for performing credit evaluation on a work publisher on the basis of a blockchain, a blockchain network comprising a plurality of service nodes, each service node having permission to publish works to the blockchain, and the device comprising:
  an originality analysis module configured to perform originality analysis, according to published works in the blockchain, on a target work published by a target service node to the blockchain, so as to obtain an originality representation value corresponding to the target work, the target service node being any service node, the originality representation value being positively correlated with a degree of originality of the target work;
  a determination module configured to: if the originality representation value is less than a first specified threshold, determine a copyright credit score decrement according to the originality representation value;
  a credit deduction transfer construction module configured to construct a credit deduction transfer on the basis of a node identifier of the target service node and the copyright credit score decrement;
  a credit deduction transfer broadcasting module configured to broadcast the credit deduction transfer to the blockchain network, such that a plurality of service nodes in the blockchain network, upon successful consensus verification of the credit deduction transfer, establish a corresponding relationship between the node identifier and the copyright credit score decrement and store the corresponding relationship in the blockchain;
  wherein a copyright credit score corresponding to the target service node is positively correlated with credit evaluation of a user corresponding to the target service node.

In the technical solution provided by the present application, the method and device can perform originality analysis on a target work published by a target service node (any service node) to the blockchain, so as to obtain an originality representation value corresponding to the target work. If the originality representation value is low (indicating that the target work is suspected of plagiarism), a copyright credit score corresponding to the target service node then receives a deduction. The deduction from the copyright credit score (that is, a copyright credit score decrement) of the target service node needs to be subjected to consensus verification performed by a plurality of service nodes and can only be made public in the blockchain after the consensus verification is successful. The blockchain can publicize a copyright credit score deduction record corresponding to the target service node, thereby determining the copyright credit score corresponding to the target service node. The lower the copyright credit score corresponding to the target service node, the poorer the credit level of the target service node. Thus, a more open and credible system for performing credit evaluation on work publishers can be established by using the feature in which data records in the blockchain are traceable and cannot be tampered with.

It should be understood that the above general description and the following detailed description are only exemplary and explanatory, and should not limit the present application.

In addition, any embodiment of the present application is not required to achieve all of the above effects.

BRIEF DESCRIPTION OF THE DRAWINGS

In order to more clearly describe the technical solutions in the present application or the prior art, the drawings needed in the description of the present application or the prior art will be briefly introduced below. Apparently, the drawings in the description below are only some embodiments of the present application, and those skilled in the art may obtain other drawings according to these drawings.

DETAILED DESCRIPTION

At present, the method of performing credit evaluation on work publishers is usually carried out by a server of a copyright credit evaluator. This centralized credit evaluation method is not open and transparent enough. Moreover, copyright credit scores corresponding to respective work publishers stored on the server of the copyright credit evaluator may be tampered with, such that the credibility of the existing method of performing credit evaluation on work publishers is not high.

In view of this, the present application provides a solution for performing credit evaluation on work publishers on the basis of a blockchain, and establishes a more open and credible system for performing credit evaluation on work publishers by using the feature in which data records in the blockchain are traceable and cannot be tampered with. Under this system, all deductions from copyright credit scores corresponding to respective service nodes in the blockchain network need to undergo consensus verification performed by a plurality of service nodes. Once the copyright credit scores corresponding to the respective service nodes are stored in the blockchain, they cannot be revoked or tampered with. Therefore, for each service node, the copyright credit score corresponding to the service node can accurately reflect the credit level of a user corresponding to the service node in the field of copyright services. This credit evaluation system can effectively regulate the publishing behaviors of service nodes and prevent the service nodes from publishing plagiarized works.

In order to enable those skilled in the art to better understand the technical solutions in the present application, the technical solutions in the present application will be described clearly and completely below with reference to the drawings in the present application. It is apparent that the described embodiments are merely some, rather than all, of the embodiments of the present application. All other embodiments obtained by those skilled in the art based on the embodiments in the present application shall fall within the scope of protection of the present application.

The technical solutions provided by the embodiments of the present application will be described below in detail with reference to the drawings.

Figure 1:
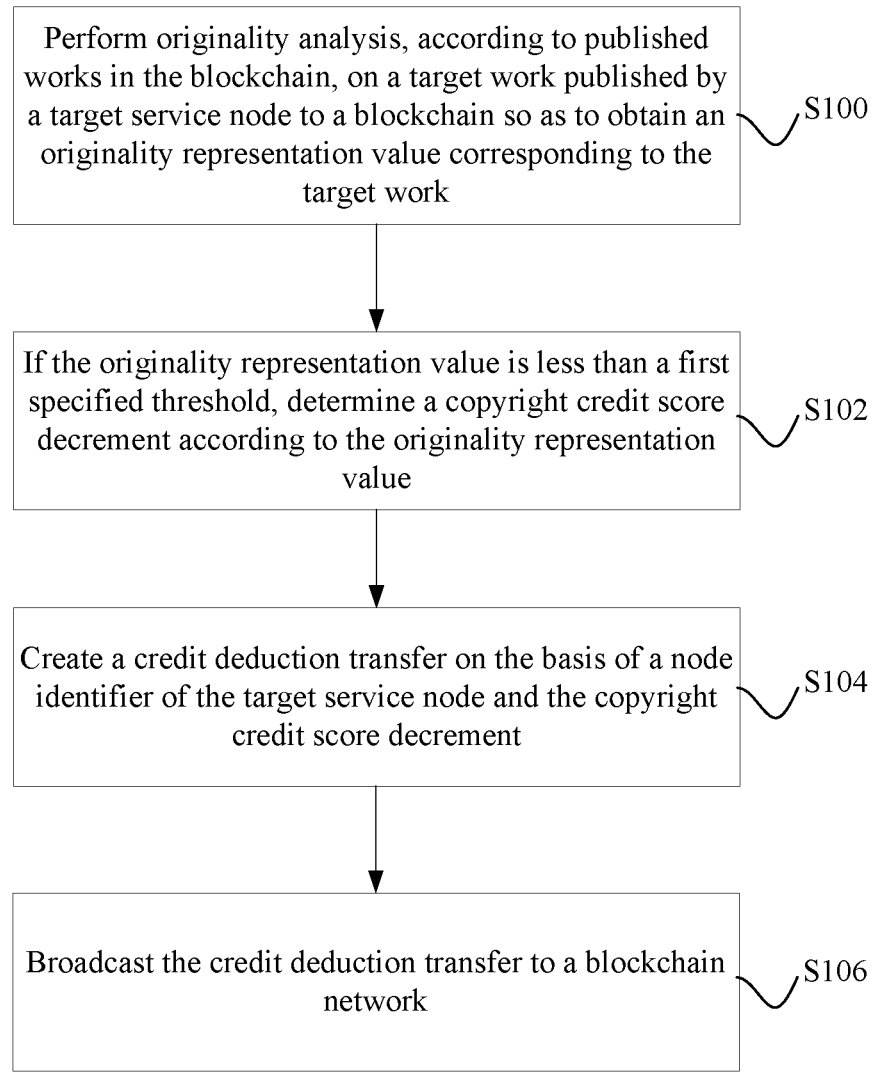
FIG. 1 is a flowchart of a method of performing credit evaluation on a work publisher on the basis of a blockchain provided by an embodiment of the present application.

FIG. 1 is a flowchart of a method of performing credit evaluation on a work publisher on the basis of a blockchain provided by an embodiment of the present application. The method includes the following steps:

S100: performing originality analysis, according to published works in the blockchain, on a target work published by a target service node to the blockchain so as to obtain an originality representation value corresponding to the target work.

In an embodiment of the present application, a blockchain network includes a plurality of service nodes, and each service node has permission to publish works to the blockchain.

An execution subject of the method may be any service node (called an execution service node) in the blockchain network, and the execution service node executes the method illustrated in FIG. 1 by calling a smart contract stored in the blockchain for implementing the flow of the method illustrated in FIG. 1. It should be noted that the execution service node may be randomly assigned from respective service nodes whenever the method illustrated in FIG. 1 needs to be executed.

It should also be noted that, since the target service node is also any service node in the blockchain network, the target service node and the execution service node may be the same service node.

In addition, a management node may be added to the blockchain network as the execution subject of the method illustrated in FIG. 1. The management node does not participate in copyright services, but is responsible for managing copyright services. The management node usually executes the method illustrated in FIG. 1 by calling a smart contract stored in the blockchain for implementing the flow of the method illustrated in FIG. 1.

The originality analysis for the target work usually refers to comparing the digital form of the target work with the digital forms of reference works in a work database by means of digital analysis on the basis of the work database, so as to determine, from the work database, a reference work most similar to the target work as a key reference work, and to obtain the similarity between the target work and the key reference work. This is a technical means well known by those skilled in the art.

The similarity is generally a value between 0% and 100%, representing the degree of similarity between the target work and the key reference work. For example, if the similarity is 20%, it indicates that the target work is 20% similar to the key reference work. Obviously, the higher the similarity, the lower the degree of originality of the target work.

It should be noted that, in an embodiment of the present application, the originality representation value is determined according to the similarity, wherein the similarity is negatively correlated with the originality representation value, and the originality representation value is positively correlated with the degree of originality of the target work. That is, the more similar the target work is to the reference work, the lower the originality representation value, and the lower the degree of originality of the target work. For example, the originality representation value may be represented as (1—the similarity).

In addition, the method for performing originality analysis on the target work is not limited to the above-mentioned one. Any technical means that can be used to perform originality analysis on the target work to obtain the corresponding originality representation value of the target work on the basis of the work database can be applied to an embodiment of the present application.

In an embodiment of the present application, the target work is a work published by the target service node to the blockchain, and the published works in the blockchain may actually be regarded as a work database for performing originality analysis on the target work.

It should be noted that the originality analysis may be performed to the target work when the target service node is requesting to publish the target work to the blockchain, or after the target service node has published the target work to the blockchain.

S102: if the originality representation value is less than a first specified threshold, determining a copyright credit score decrement according to the originality representation value.

In an embodiment of the present application, a first specified threshold may be preset. If the originality representation value corresponding to the target work is less than the first specified threshold, it indicates that the degree of originality of the target work is low, and the degree of imitating a published work in the blockchain is high, a pattern that is not encouraged by the blockchain copyright service mode, and will lead to a deduction from the credit score corresponding to the target service node publishing the target work. The deduction from the credit score corresponding to the target service node means that the credit evaluation of the user corresponding to the target service node is reduced.

For example, the first specified threshold may be 60%, and if the originality representation value is less than 60%, it indicates that the degree of originality of the target work is low.

In an embodiment of the present application, the copyright credit score decrement refers to a credit score to be deducted from, which is usually a positive value. The copyright credit score decrement may be determined randomly or according to actual service needs. Those skilled in the art can easily conceive of a variety of techniques for determining the copyright credit score decrement according to the originality representation value. Preferably, the originality representation value may be negatively correlated with the copyright credit core decrement.

An exemplary technique for determining the copyright credit score decrement is provided herein as follows, and those skilled in the art can understand that this does not constitute a limitation to the present solution.

Specifically, if the originality representation value is less than a second specified threshold, a first specified score may be determined as the copyright credit score decrement, wherein the second specified threshold is less than the first specified threshold. The meaning here is as follows: the originality representation value being less than the first specified threshold indicates that the degree of originality of the target work is low, while the originality representation value being less than the second specified threshold indicates that the degree of originality of the target work is too low, such that the target work may be substantially identified as a plagiarized work. In this case, the target work is identified as a plagiarized work, and the copyright credit score decrement is determined as a fixed score (i.e., the first specified score). It can be seen that, once a work is identified as a plagiarized work, the copyright credit score decrement caused by the plagiarized work can be a fixed score.

If the originality representation value is not less than the second specified threshold, the copyright credit score decrement is determined according to the originality representation value. In this case, the originality representation value is negatively correlated with the determined copyright credit score decrement, and the determined copyright credit score decrement is less than the first specified score. The meaning here is as follows: although the originality representation value is less than the first specified threshold, which indicates that the degree of originality of the target work is low, it is not less than the second specified threshold, which indicates that the degree of originality is not too low to identify the target work as a plagiarized work. In this case, the copyright credit score decrement may be less than the first specified score, and the higher the originality representation value, the lower the copyright credit score decrement.

For example, the first specified threshold is 60%, and the second specified threshold may be 40%. If the originality representation value corresponding to the target work is between 40% and 60%, it indicates that the degree of originality of the target work is low, but it is not proper to identify the target work as a plagiarized work. If the originality representation value corresponding to the target work is less than 40%, it indicates that the degree of originality of the target work is too low and it is proper to identify the target work as a plagiarized work.

Further, when the target work is identified as a plagiarized work (that is, the originality representation value is less than the second specified threshold), the copyright credit score decrement may be determined according to the historical work publishing performance of the target service node (for example, the ratio of plagiarized works in the published works of the target service node).

Specifically, the quantity of the published works corresponding to the target service node in the blockchain may be determined. If the quantity has reached a specified quantity, the proportion of plagiarized works in the works published by the target service node to the blockchain is determined as a plagiarism proportion. If the plagiarism proportion is greater than a first specified proportion, a punishment coefficient is determined according to the plagiarism proportion; the punishment coefficient is not less than 1; the plagiarism proportion is positively correlated with the punishment coefficient.

The specified quantity and the first specified proportion may be specified according to the actual service needs. The plagiarism proportion being more than the first specified proportion means that the historical performance of the target service node publishing works is relatively poor, and the punishment to the target service node should be increased. Therefore, a punishment coefficient not less than 1 is determined. The higher the plagiarism proportion, the greater the punishment coefficient.

For example, the quantity of works published by the target service node to the blockchain is 100, the quantity of works with an originality representation value less than the second specified threshold (i.e. plagiarized works) is 80, then the plagiarism proportion is 80%, and the corresponding punishment coefficient may be determined to be 1.5. For another example, the quantity of works published by the target service node to the blockchain is 100, the quantity of works with an originality representation value less than the second specified threshold (i.e. plagiarized works) is 60, then the plagiarism proportion is 60%, and the corresponding punishment coefficient may be determined to be 1.3.

In this way, when the originality representation value is less than the second specified threshold, the first specified score can be multiplied by the punishment coefficient, and the first specified score multiplied by the punishment coefficient can be determined as the copyright credit score decrement, thus achieving the purpose of increasing the punishment.

For example, it is assumed that before the target service node publishes the target work to the blockchain, it has published 99 works to the blockchain, of which 59 works are plagiarized works (i.e., works with an originality representation value less than the second specified threshold 40%). Then, the target service node publishes the target work to the blockchain. Through step S100, the originality representation value corresponding to the target work is determined to be 30%, which is less than the second specified threshold 40%, indicating that the target work can be identified as a plagiarized work. In this case, a copyright credit score decrement needs to be determined. Specifically, it is first determined whether or not the quantity of works published by the target service node to the blockchain has reached a specified quantity (for example, the specified quantity is 100). Obviously, it has reached the specified quantity. Then, it is determined that the plagiarism proportion is 60% and the corresponding punishment coefficient is 1.3. Assuming that the first specified score is 20 points, then the copyright credit score decrement is 20*1.2=24 points.

S104: constructing a credit deduction transfer on the basis of a node identifier of the target service node and the copyright credit score decrement.

Transfers described herein may refer to data that is created by users via clients of the blockchain and needs to be eventually published to a distributed database of the blockchain.

The transfers in the blockchain may be divided into narrow-sense transfers and broad-sense transfers. A narrow-sense transfer refers to a value transfer published by a user to the blockchain; for example, in a conventional bitcoin blockchain network, a transfer may be an account transfer initiated by a user in the blockchain. A broad-sense transfer refers to service data with service intention published by a user to the blockchain; for example, an operator may build a consortium blockchain based on actual service needs, and deploy some other types of online services unrelated to value transfer (for example, a house-rental service, vehicle scheduling service, insurance claims service, credit service, medical service, etc.) relying on the consortium blockchain. In this consortium blockchain, a transfer may be a service message or service request with service intention published by a user in the consortium blockchain.

In an embodiment of the present application, the credit deduction transfer actually refers to data including the node identifier of the target service node and the copyright credit score decrement.

S106: broadcasting the credit deduction transfer to the blockchain network.

The credit deduction transfer is broadcast to the blockchain network, such that a plurality of service nodes in the blockchain network, upon successful consensus verification of the credit deduction transfer, establish a corresponding relationship between the node identifier and the copyright credit score decrement and store the corresponding relationship in the blockchain (i.e., store the corresponding relationship between the node identifier and the copyright credit score decrement in the blockchain). The plurality of service nodes may be all service nodes in the blockchain network, or may be part of the service nodes in the blockchain network.

In this way, the credit score deduction for the target service node is completed, and the deducted credit score of the target service node (i.e., the credit score decrement corresponding to the target service node) will be made public in the blockchain.

It should be noted here that in an embodiment of the present application, a certain initial copyright credit score may be allocated to each service node in the blockchain network in advance. Moreover, no certain initial copyright credit score may be allocated to each service node, and the initial copyright credit score corresponding to each service node would be 0 in this case.

Assuming that the initial copyright credit score corresponding to the target service node is 100 points, through steps S100-S106, the copyright credit score decrement corresponding to the target service node (assumed to be 15 points) is made public in the blockchain, that is, the credit score corresponding to the target service node is adjusted from 100 points to 100–15=85 points.

Using the method of performing credit evaluation on a work publisher on the basis of a blockchain illustrated in FIG. 1, one can perform originality analysis on a target work published by a target service node (any service node) to the blockchain, so as to obtain an originality representation value corresponding to the target work. If the originality representation value is low (indicating that the target work is suspected of plagiarism), a copyright credit score corresponding to the target service node then receives a deduction. The deduction from the copyright credit score (that is, a copyright credit score decrement) of the target service node needs to be subjected to consensus verification performed by a plurality of service nodes and can only be made public in the blockchain after the consensus verification is successful. The blockchain can make public the copyright credit score deduction record corresponding to the target service node, based on which the copyright credit score corresponding to the target service node can be determined. The lower the copyright credit score corresponding to the target service node, the poorer the credit level of the target service node. Thus, a more open and credible system for performing credit evaluation on work publishers can be established by using the feature in which data records in the blockchain are traceable and cannot be tampered with, thereby preventing service nodes from publishing plagiarized works.

In addition, in S104, a credit deduction transfer may be constructed on the basis of a node identifier of the target service node, the copyright credit score decrement, and a work identifier of the target work. In step S106, the credit deduction transfer is broadcast to the blockchain network, such that a plurality of service nodes in the blockchain network, upon successful consensus verification of the credit deduction transfer, establish a corresponding relationship among the node identifier, the copyright credit score decrement, and the work identifier, and store the corresponding relationship in the blockchain. In this way, the following information can also be made public in the blockchain: the copyright credit score decrement is caused by the target work.

Furthermore, in step S104, a credit deduction transfer may be constructed on the basis of a node identifier of the target service node, the copyright credit score decrement, a work identifier of the target work, and the originality representation value. In step S106, the credit deduction transfer is broadcast to the blockchain network, such that a plurality of service nodes in the blockchain network, upon successful consensus verification of the credit deduction transfer, establish a corresponding relationship among the node identifier, the copyright credit score decrement, the work identifier, and the originality representation value, and store the corresponding relationship in the blockchain. In this way, the following information can also be made public in the blockchain: the copyright credit score decrement is caused by the target work, and the degree of originality of the target work.

In addition, in an embodiment of the present application, if the target work is a plagiarized work (the originality representation value is less than the second specified threshold), after the credit deduction transfer is broadcast to the blockchain network, whether to increase the copyright credit score decrement caused by the target work may be determined by identifying the earnings generated by the target work and using the identified earnings as an indicator. Specific techniques to implement at least include the following three:

Technique 1: copyright earnings generated by the target work can be identified; if the identified copyright earnings have reached a first specified amount, a supplementary copyright credit score decrement corresponding to the copyright credit score decrement is determined according to the identified copyright earnings, the determined supplementary copyright credit score decrement is positively correlated with the identified copyright earnings; a supplementary credit deduction transfer is constructed based on the node identifier and the determined supplementary copyright credit score decrement; the supplementary credit deduction transfer is broadcast to the blockchain network, such that a plurality of service nodes in the blockchain network, upon successful consensus verification of the supplementary credit deduction transfer, establish a corresponding relationship between the node identifier and the determined supplementary copyright credit score decrement and store the corresponding relationship in the blockchain.

The supplementary copyright credit score decrement means a supplement to the copyright credit score decrement, which means a supplementary deduction from the copyright credit score, which is actually a copyright credit score decrement. Here, it is described as "supplementary" just for the sake of distinction in description. The supplementary credit deduction transfer is a credit deduction transfer in essence, which is also described as "supplementary" for the sake of distinction in description.

It should be noted that the first specified amount may be specified according to service needs. If the identified earnings do not reach the first specified amount, it indicates that the accumulative earnings of the target work are low (that is, the earnings obtained from copyright infringement are low), and a supplementary reduction to the credit score may not need to be performed.

For example, the first specified amount can be preset as 10000 yuan, and above the first specified amount, three amount intervals may be set, which are respectively [10000, 15000], [15000, 30000], and [30000, 50000], and supplementary deduction coefficients of 0.5, 0.8 and 1 are respectively assigned to these three amount intervals. Assuming that the target work is a plagiarized work, the copyright credit score decrement caused by the target work is 20 points, which has been made public in the blockchain. If, after a period of time, the accumulative earnings generated by the target work reach 10000 yuan, a supplementary credit score deduction may be performed with respect to the target service node publishing the target work. Based on the continuous accumulation of the earnings generated by the target work, when the accumulative earnings fall into the interval [10000, 15000], the copyright credit score to be supplementarily deducted with respect to the target service node is 20*0.5=10 points, which is equivalent to that, since the target service node publishes the target work (identified as a plagiarized work), the total credit score deducted so far has reached 20+10=30 points. Then, when the accumulative earnings fall into the interval [15000, 30000], the copyright credit score to be supplementarily deducted with respect to the target service node is 20*0.8=16 points, which is equivalent to that, since the target service node publishes the target work (identified as a plagiarized work), the total credit score deducted so far has reached 20+10+16=46 points. As the earnings continuously accumulate, the copyright credit score deducted since the target service node publishes the plagiarized work will become more and more.

Technique 2: for each of a plurality of specified periods, copyright earnings generated by the target work within the specified period are statistically collected as copyright earnings corresponding to the specified period. The copyright earnings respectively corresponding to the plurality of specified periods are averaged to obtain average copyright earnings. If the average copyright earnings have reached a second specified amount, a supplementary copyright credit score decrement corresponding to the copyright credit score decrement is determined according to the average copyright earnings. The determined supplementary copyright credit score decrement is positively correlated with the average copyright earnings. A supplementary credit deduction transfer is constructed based on the node identifier and the determined supplementary copyright credit score decrement, and the supplementary credit deduction transfer is broadcast to the blockchain network, such that a plurality of service nodes in the blockchain network, upon successful consensus verification of the supplementary credit deduction transfer, establish a corresponding relationship between the node identifier and the determined supplementary copyright credit score decrement and store the corresponding relationship in the blockchain.

With regard to technique 2, whether or not to perform supplementary credit score deduction is actually determined according to the average earnings of the target work in the plurality of specified periods.

For example, the second specified amount can be preset as 10000 yuan, and above the second specified amount, three amount intervals may be set, which are respectively [10000, 15000], [15000, 30000], and [30000, 50000], and supplementary deduction coefficients of 0.5, 0.8 and 1 are respectively assigned to these three amount intervals. Assuming that the target work is a plagiarized work, the copyright credit score decrement caused by the target work is 20 points, and it has been made public in the blockchain. Assuming that the specified period is 1 month, the average value of the earnings generated by the target work every month within 10 months after the target service node publishes the target work can be statistically calculated as 16000 yuan, which falls into the amount interval [15000, 30000], the corresponding supplementary deduction coefficient is 0.8, and a supplementary deduction from the credit score can be performed on the target service node publishing the target work. Assuming that the target work is a plagiarized work and the copyright credit score decrement caused by the target work is 20 points, the specifically deduced score is 20*0.8=16 points. Equivalently, since the target service node publishes the target work (identified as a plagiarized work), the total credit score deducted so far has reached 20+16=36 points.

Technique 3: copyright earnings generated by an original work plagiarized by the target work are identified. A supplementary copyright credit score decrement corresponding to the copyright credit score decrement is determined according to the identified copyright earning. The determined supplementary copyright credit score decrement is positively or negatively correlated with the identified copyright earnings. Subsequently, a supplementary credit deduction transfer is constructed based on the node identifier and the determined supplementary copyright credit score decrement, and the supplementary credit deduction transfer is broadcast to the blockchain network, such that a plurality of service nodes in the blockchain network, upon successful consensus verification of the supplementary credit deduction transfer, establish a corresponding relationship between the node identifier and the determined supplementary copyright credit score decrement and store the corresponding relationship in the blockchain.

With regard to technique 3, supplementary deduction from the credit score is actually performed by using the copyright earnings generated by the original work plagiarized by the target work as an indicator, and the loss suffered by the original work is used as a reference factor to determine the punishment to the target service node plagiarizing the original work. Specifically, it may be specified that the lower the earnings of the original work, the greater the supplementary credit score decrement; or it may be specified that the lower the earnings of the original work, the smaller the supplementary credit score decrement.

In addition, in an embodiment of the present application, not only can copyright credit score deduction be performed on a target service node which publishes a work with a low originality degree, but it can also be used to perform copyright credit score addition on a target service node which publishes a work with a high originality degree.

Specifically, if the originality representation value is greater than the first specified threshold, a copyright credit score increment is determined according to the originality representation value; a credit addition transfer is constructed based on the node identifier and the copyright credit score increment; the credit addition transfer is broadcast to the blockchain network, such that a plurality of service nodes in the blockchain network, upon successful consensus verification of the credit addition transfer, establish a corresponding relationship between the node identifier and the copyright credit score increment and store the corresponding relationship in the blockchain.

In an embodiment of the present application, if the originality representation value corresponding to the target work is more than the first specified threshold, it indicates that the degree of originality of the target work is high. This is encouraged by the blockchain copyright service mode, and will lead to the addition of the credit score corresponding to the target service node which publishes the target work. The addition of the credit score corresponding to the target service node means that the credit evaluation of the user corresponding to the target service node is elevated.

For example, the first specified threshold may be 60%. If the originality representation value is more than 60%, it indicates that the degree of originality of the target work is high.

In an embodiment of the present application, the copyright credit score increment refers to the credit score to be added, which is usually a positive value. The copyright credit score increment may be determined randomly or according to the actual service needs. Those skilled in the art can easily conceive of a variety of techniques for determining the copyright credit score increment according to the originality representation value. Preferably, the originality representation value may be positively correlated with the copyright credit core increment.

An exemplary technique for determining the copyright credit score increment is provided herein as follows, and those skilled in the art can understand that this does not constitute a limitation to the present solution.

Specifically, if the originality representation value is greater than a third specified threshold, a second specified score may be determined as the copyright credit score increment. The third specified threshold is greater than the first specified threshold. The meaning here is as follows: the originality representation value being more than the first specified threshold indicates that the degree of originality of the target work is high, while the originality representation value being more than the third specified threshold indicates that the degree of originality of the target work is very high, such that the target work may be substantially identified as an original work. In this case, the target work is identified as an original work, and the copyright credit score increment is determined as a fixed score (i.e., the second specified score). It can be seen that, once a work is identified as an original work, the copyright credit score increment caused by the original work may be a fixed score.

If the originality representation value is not greater than the third specified threshold, a copyright credit score increment is determined according to the originality representation value. In this case, the originality representation value is positively correlated with the determined copyright credit score increment, and the determined copyright credit score increment is less than the second specified score. The meaning here is as follows: although the originality representation value is greater than the first specified threshold, which indicates that the degree of originality of the target work is high, it is not greater than the third specified threshold, which indicates that the degree of originality is not particularly high and it is not proper to identify it as an original work. In this case, the copyright credit score increment may be less than the second specified score, and the higher the originality representation value, the higher the copyright credit score increment.

For example, the first specified threshold is 60%, and the third specified threshold may be 80%. If the originality representation value corresponding to the target work is between 60% and 80%, it indicates that the degree of originality of the target work is high, but it is not proper to identify it as an original work; if the originality representation value corresponding to the target work is more than 80%, it indicates that the degree of originality of the target work is very high and it is proper to identify it as an original work.

Further, when the originality representation value is greater than the third specified threshold (that is, when the target work is an original work), the copyright credit score increment may be determined according to the historical performance of the target service node publishing works (for example, the proportion of original works in the published works of the target service node).

Specifically, the quantity of published works corresponding to the target service node in the blockchain is determined; if the quantity has reached a specified quantity, the proportion of original works in the works published by the target service node to the blockchain is determined as an originality proportion; if the originality proportion is greater than a second specified proportion, a reward coefficient is determined according to the originality proportion; the reward coefficient is not less than 1; the originality proportion is positively correlated with the reward coefficient.

The specified quantity and the second specified proportion may be specified according to the actual service needs. The originality proportion being more than the first specified proportion means that the historical performance of the target service node publishing works is relatively good, and the reward to the target service node should be increased. Therefore, a reward coefficient not less than 1 is determined. The higher the originality proportion, the greater the reward coefficient.

For example, the quantity of works which have been published by the target service node to the blockchain is 100, the quantity of works with an originality representation value more than the third specified threshold (i.e. original works) is 80, the originality proportion is 80%, and the corresponding reward coefficient may be determined to be 1.3. For another example, the quantity of works which have been published by the target service node to the blockchain is 100, the quantity of works with an originality representation value more than the third specified threshold (i.e. original works) is 60, the originality proportion is 60%, and the corresponding reward coefficient may be determined to be 1.1. It is worth emphasizing here that, in general, for the originality proportion and plagiarism proportion, in a situation that the two proportions are the same, the reward coefficient corresponding to the originality proportion is smaller than the punishment coefficient corresponding to the plagiarism proportion.

In this way, when the originality representation value is greater than the third specified threshold, the second specified score may be multiplied by the reward coefficient, and the second specified score multiplied by the reward coefficient may be determined as the copyright credit score increment, thus realizing the purpose of increasing the reward.

For example, it is assumed that before the target service node publishes the target work to the blockchain, it has published 99 works to the blockchain, of which 59 works are original works (i.e., works with an originality representation value more than the third specified threshold 80%). Then, the target service node publishes the target work to the blockchain. The originality representation value corresponding to the target work is determined to be 90%, which is more than the third specified threshold 80%, indicating that the target work may be identified as an original work. In this case, the copyright credit score increment needs to be determined. Specifically, whether the quantity of works published by the target service node to the blockchain has reached the specified quantity (for example, the specified quantity is 100) is determined first. Obviously, it has reached the specified quantity. Then, it is determined that the originality proportion is 60% and the corresponding reward coefficient is 1.1. Assuming that the second specified score is 20 points, the copyright credit score increment is 20*1.1=22 points.

In addition, it should be noted that the credit score corresponding to the target service node may be obtained by combining the copyright credit score increments and copyright credit score decrements corresponding to the target service node stored in the blockchain. For example, there are three copyright credit score increments corresponding to the target service node in the blockchain, which are 20, 15 and 10; there are two copyright credit score decrements corresponding to the target service node in the blockchain, which are 20 and 14. Therefore, the credit score corresponding to the target service node is: 20+15+10−20−14=11 points.

In addition, a credit addition transfer may be constructed on the basis of a node identifier of the target service node, the copyright credit score increment, and a work identifier of the target work. Subsequently, the credit addition transfer is broadcast to the blockchain network, such that a plurality of service nodes in the blockchain network, upon successful consensus verification of the credit addition transfer, establish a corresponding relationship among the node identifier, the copyright credit score increment, and the work identifier, and store the corresponding relationship in the blockchain. In this way, the following information will also be made public in the blockchain: the copyright credit score increment is caused by the target work.

In addition, a credit addition transfer may be constructed on the basis of a node identifier of the target service node, the copyright credit score increment, a work identifier of the target work and the originality representation value. Then, the credit addition transfer is broadcast to the blockchain network, such that a plurality of service nodes in the blockchain network, upon successful consensus verification on the credit addition transfer, establish a corresponding relationship among the node identifier, the copyright credit score increment, the work identifier and the originality representation value, and store the corresponding relationship in the blockchain. In this way, the following information will also be made public in the blockchain: the copyright credit score increment is caused by the target work, and the degree of originality of the target work.

Further, in an embodiment of the present application, if the target work is an original work (the originality representation value is greater than the third specified threshold), after the credit addition transfer is broadcast to the blockchain network, whether to increase the copyright credit score increment caused by the target work may be determined by identifying the earnings generated by the target work and using the identified earnings as an indicator. Specific implementation techniques at least include the following two:

Technique 1: copyright earnings generated by the target work may be identified; if the identified copyright earnings have reached a third specified amount, a supplementary copyright credit score increment corresponding to the copyright credit score increment is determined according to the identified copyright earnings, the determined supplementary copyright credit score increment is positively correlated with the identified copyright earnings; a supplementary credit addition transfer is constructed based on the node identifier and the determined supplementary copyright credit score increment; the supplementary credit addition transfer is broadcast to the blockchain network, such that a plurality of service nodes in the blockchain network, upon successful consensus verification of the supplementary credit addition transfer, establish a corresponding relationship between the node identifier and the determined supplementary copyright credit score increment and store the corresponding relationship in the blockchain.

The supplementary copyright credit score increment means a supplement to the copyright credit score increment, which means supplementary addition of the copyright credit score, which is actually a copyright credit score increment. Here, it is described as "supplementary" just for the sake of distinction in description. The supplementary credit addition transfer is a credit addition transfer in essence, which is also described as "supplementary" for the sake of distinction in description.

It should be noted that the third specified amount may be specified according to service needs. If the identified earnings do not reach the third specified amount, it indicates that the accumulative earnings of the target work are few, and supplementary addition of the credit score may not be performed.

For example, the third specified amount may be preset as 10000 yuan, and above the third specified amount, three amount intervals may be set, which are respectively [10000, 15000], [15000, 30000], and [30000, 50000], and supplementary addition coefficients of 0.5, 0.8, and 1 are respectively assigned to these three amount intervals. Assuming that the target work is an original work, the copyright credit score increment caused by the target work is 20 points, which has been made public in the blockchain. If, after a period of time, the accumulative earnings generated by the target work reach 10000 yuan, supplementary credit score addition may be performed to the target service node publishing the target work. Based on the continuous accumulation of the earnings generated by the target work, when the accumulative earnings fall into the interval [10000, 15000], the copyright credit score to be supplementarily added to the target service node is 20*0.5=10 points, which is equivalent to that, since the target service node publishes the target work (identified as an original work), the total credit score added so far has reached 20+10=30 points. Then, when the accumulative earnings fall into the interval [15000, 30000], the copyright credit score to be supplementarily added to the target service node is 20*0.8=16 points, which is equivalent to that, since the target service node publishes the target work (identified as an original work), the total credit score added so far has reached 20+10+16=46 points. As the earnings continuously accumulate, the copyright credit score added to the target service node due to its publishing of the original work will become more and more.

Technique 2: for each of a plurality of specified periods, copyright earnings generated by the target work within the specified period are statistically collected as copyright earnings corresponding to the specified period; the copyright earnings respectively corresponding to the plurality of specified periods are averaged to obtain average copyright earnings; if the average copyright earnings have reached a fourth specified amount, a supplementary copyright credit score increment corresponding to the copyright credit score increment is determined according to the average copyright earnings; the determined supplementary copyright credit score increment is positively correlated with the average copyright earnings; a supplementary credit addition transfer is constructed based on the node identifier and the determined supplementary copyright credit score increment; the supplementary credit addition transfer is broadcast to the blockchain network, such that a plurality of service nodes in the blockchain network, upon successful consensus verification of the supplementary credit addition transfer, establish a corresponding relationship between the node identifier and the supplementary copyright credit score increment and store the corresponding relationship in the blockchain.

With regard to technique 2, actually whether to perform supplementary credit score addition is determined according to the average earnings of the target work in the plurality of specified periods.

For example, the fourth specified amount may be preset as 10000 yuan, and above the fourth specified amount, three amount intervals may be set, which are respectively [10000, 15000], [15000, 30000], and [30000, 50000], and supplementary addition coefficients of 0.3, 0.5 and 0.8 are respectively assigned to these three amount intervals. Assuming that the target work is an original work, the copyright credit score increment caused by the target work is 20 points, which has been made public in the blockchain. Assuming that the specified period is 1 month, it may be statistically collected that the average value of the earnings generated by the target work every month within 10 months after the target service node publishes the target work is 16000 yuan, which falls into the amount interval [15000, 30000], and the corresponding supplementary addition coefficient is 0.5, and supplementary addition of the credit score may be performed to the target service node publishing the target work. Assuming that the target work is an original work and the copyright credit score increment caused by the target work is 20 points, the specifically added score is 20*0.5=10 points. Equivalently, because the target service node publishes the target work (identified as an original work), the total credit score added so far has reached 20+10=30 points.

In addition, in an embodiment of the present application, when the copyright credit score corresponding to the target service node is lower than a preset score, a preset service restriction operation is performed to the target service node. The service restriction operation is not specifically limited herein. For example, the service restriction operation may be to forbid the target service node to publish works to the blockchain.

In an embodiment of the present application, a comprehensive credit score of the user corresponding to the target service node may also be adjusted according to the copyright credit score corresponding to the target service node.

Specifically, the copyright credit score corresponding to the target service node is divided by the quantity of works published by the target service node to the blockchain, so as to obtain a corrected copyright credit score corresponding to the target service node. Then, the corrected copyright credit score is provided to a comprehensive credit evaluator, such that the comprehensive credit evaluator converts the corrected copyright credit score into a comprehensive credit reference score according to the corrected copyright credit score and a preset conversion rule, and adjusts the comprehensive credit score of the user corresponding to the target service node according to the comprehensive credit reference score.

In the present application, the copyright credit score is the credit score to measure a person's credit level in the copyright service field, and the comprehensive credit score may be a credit score such as Central Bank credit score, Sesame credit score or the like which measures a person's comprehensive credit.

For example, assuming that the copyright credit score corresponding to the target service node is 250 and the total quantity of copyrighted works published by the target service node is 25, the corrected copyright credit score corresponding to the target service node is 250/25=10 points. Assuming that the conversion rule is 1 copyright credit score=0.5 comprehensive credit score, then the comprehensive credit evaluator may convert points of corrected copyright credit score into 5 points of comprehensive credit reference score, and accordingly adjust the comprehensive credit score of the user corresponding to the target service node.

Figure 2:
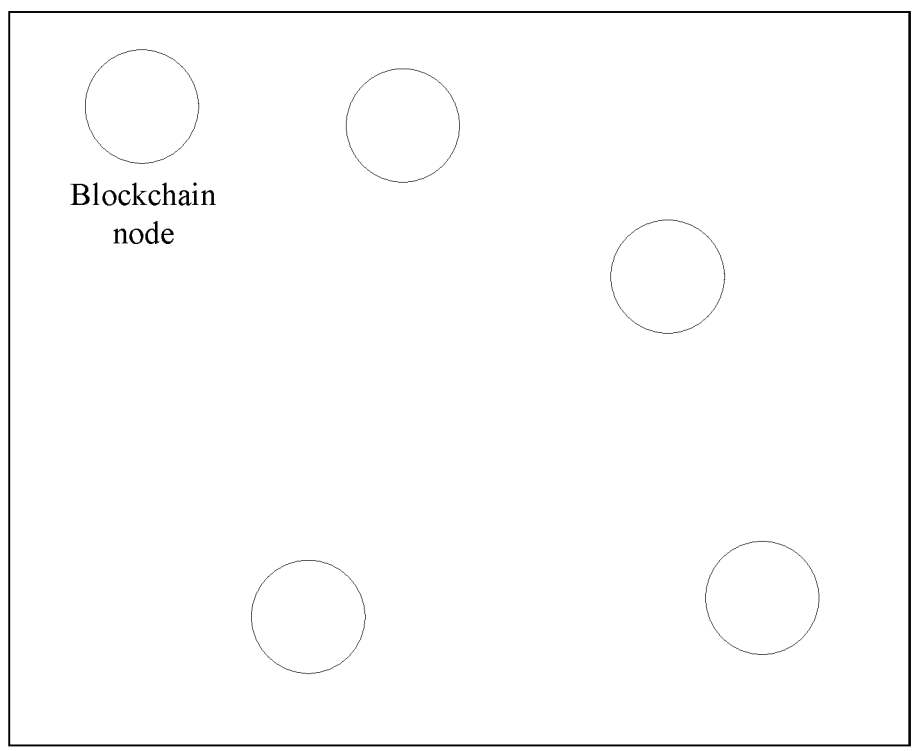
FIG. 2 is a structural schematic diagram of a device for performing credit evaluation on a work publisher on the basis of a blockchain provided by an embodiment of the present application.

Based on the blockchain-based method of performing credit evaluation on a work publisher shown in FIG. 1, an embodiment of the present application further provides a system for performing credit evaluation on a work publisher on the basis of a blockchain, as illustrated in FIG. 2, which includes a plurality of blockchain nodes;

for each blockchain node, the blockchain node has the function of implementing the method illustrated in FIG. 1, and/or participating in consensus verification of a credit deduction transfer, establishing a corresponding relationship between the node identifier and the copyright credit score decrement and storing the corresponding relationship in the blockchain after consensus verification of the credit deduction transfer has been deemed successful.

Figure 3:
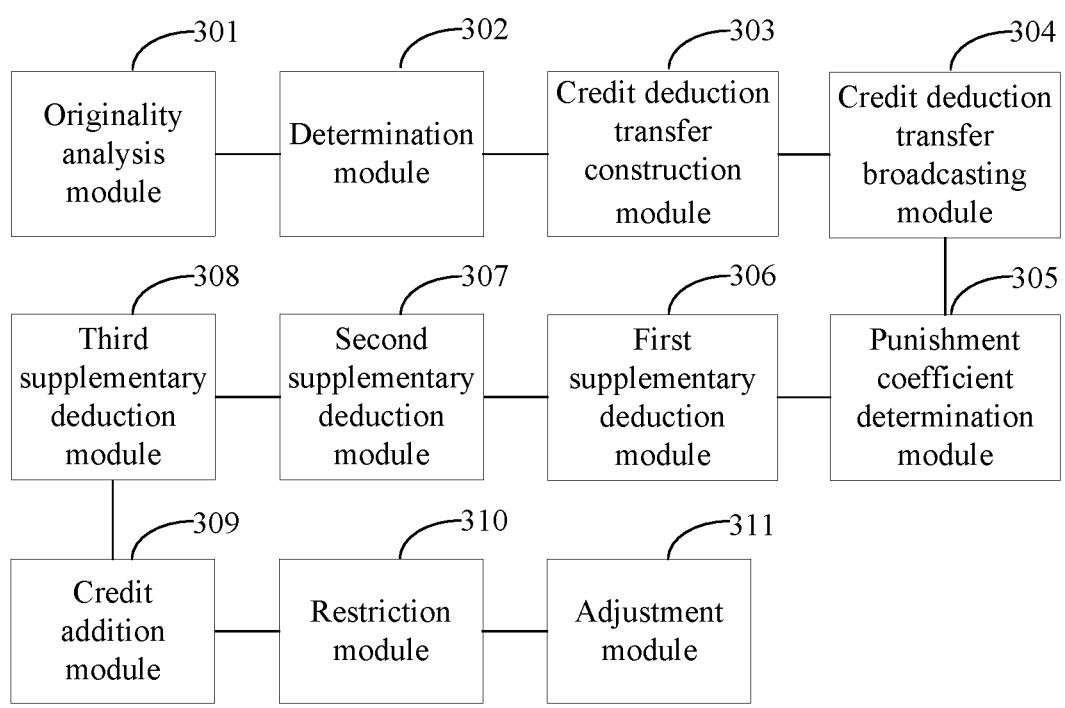
FIG. 3 is a structural schematic diagram of a system for performing credit evaluation a work publisher on the basis of a blockchain provided by an embodiment of the present application.

Based on the blockchain-based method of performing credit evaluation on a work publisher illustrated in FIG. 1, an embodiment of the present application further correspondingly provides a device for performing credit evaluation on a work publisher on the basis of a blockchain, as illustrated in FIG. 3, a blockchain network includes a plurality of service nodes, each service node has permission to publish works to the blockchain, and the device includes:

an originality analysis module 301 configured to perform originality analysis, according to published works in the blockchain, on a target work published by a target service node to the blockchain, so as to obtain an originality representation value corresponding to the target work, the target service node being any service node, the originality representation value being positively correlated with the degree of originality of the target work;

a determination module 302 configured to: if the originality representation value is less than a first specified threshold, determine a copyright credit score decrement according to the originality representation value;

a credit deduction transfer construction module 303 configured to construct a credit deduction transfer on the basis of a node identifier of the target service node and the copyright credit score decrement;

a credit deduction transfer broadcasting module 304 configured to broadcast the credit deduction transfer to the blockchain network, such that a plurality of service nodes in the blockchain network, upon successful consensus verification of the credit deduction transfer, establish a corresponding relationship between the node identifier and the copyright credit score decrement and store the corresponding relationship in the blockchain;

wherein a copyright credit score corresponding to the target service node is positively correlated with credit evaluation of a user corresponding to the target service node.

The determination module 302 is configured to: if the originality representation value is less than a second specified threshold, determine a first specified score as the copyright credit score decrement, the second specified threshold being less than the first specified threshold; if the originality representation value is not less than the second specified threshold, determine the copyright credit score decrement according to the originality representation value, wherein, if the originality representation value is not less than the second specified threshold, the originality representation value is negatively correlated with the determined copyright credit score decrement, and the determined copyright credit score decrement is less than the first specified score.

When the originality representation value is less than the second specified threshold, the target work is a plagiarized work;

the device further includes a punishment coefficient determination module 305 configured to: if the originality representation value is less than the second specified threshold, before determining the first specified score as the copyright credit score decrement, determine the quantity of published works corresponding to the target service node in the blockchain; if the quantity has reached a specified quantity, determine the proportion of plagiarized works in the works published by the target service node to the blockchain as a plagiarism proportion; if the plagiarism proportion is greater than a first specified proportion, determine a punishment coefficient according to the plagiarism proportion, the punishment coefficient being not less than 1, the plagiarism proportion being positively correlated with the punishment coefficient;

the determination module 302 is configured to multiply the punishment coefficient by the first specified score; determine the first specified score multiplied by the punishment coefficient as the copyright credit score decrement.

The device further includes a first supplementary deduction module 306 configured to: if the originality representation value is less than the second specified threshold, after broadcasting the credit deduction transfer to the blockchain network, monitor copyright earnings generated by the target work; if the monitored copyright earnings have reached a first specified amount, determine a supplementary copyright credit score decrement corresponding to the copyright credit score decrement according to the identified copyright earnings, the determined supplementary copyright credit score decrement being positively correlated with the identified copyright earnings; construct a supplementary credit deduction transfer on the basis of the node identifier and the determined supplementary copyright credit score decrement; broadcast the supplementary credit deduction transfer to the blockchain network, such that a plurality of service nodes in the blockchain network, upon successful consensus verification of the supplementary credit deduction transfer, establish a corresponding relationship between the node identifier and the determined supplementary copyright credit score decrement and store the corresponding relationship in the blockchain.

The device further includes a second supplementary deduction module 307 configured to: if the originality representation value is less than the second specified threshold, after broadcasting the credit deduction transfer to the blockchain network, for each of a plurality of specified periods, statistically collect copyright earnings generated by the target work within the specified period as copyright earnings corresponding to the specified period; average copyright earnings respectively corresponding to the plurality of specified periods to obtain average copyright earnings; if the average copyright earnings have reached a second specified amount, determine a supplementary copyright credit score decrement corresponding to the copyright credit score decrement according to the average copyright earnings, the determined supplementary copyright credit score decrement being positively correlated with the average copyright earnings; construct a supplementary credit deduction transfer on the basis of the node identifier and the determined supplementary copyright credit score decrement; broadcast the supplementary credit deduction transfer to the blockchain network, such that a plurality of service nodes in the blockchain network, upon successful consensus verification of the supplementary credit deduction transfer, establish a corresponding relationship between the node identifier and the determined supplementary copyright credit score decrement and store the corresponding relationship in the blockchain.

When the originality representation value is less than the second specified threshold, the target work is a plagiarized work;

the device further includes a third supplementary deduction module 308 configured to: if the originality representation value is less than the second specified threshold, after broadcasting the credit deduction transfer to the blockchain network, monitor copyright earnings generated by an original work plagiarized by the target work; determine a supplementary copyright credit score decrement corresponding to the copyright credit score decrement according to the monitored copyright earnings, the determined supplementary copyright credit score decrement being positively or negatively correlated with the identified copyright earnings; construct a supplementary credit deduction transfer on the basis of the node identifier and the determined supplementary copyright credit score decrement; broadcast the supplementary credit deduction transfer to the blockchain network, such that a plurality of service nodes in the blockchain network, upon successful consensus verification of the supplementary credit deduction transfer, establish a corresponding relationship between the node identifier and the determined supplementary copyright credit score decrement and store the corresponding relationship in the blockchain.

The device further includes a credit addition module 309, configured to: if the originality representation value is greater than the first specified threshold, determine a copyright credit score increment according to the originality representation value; construct a credit addition transfer on the basis of the node identifier and the copyright credit score increment; broadcast the credit addition transfer to the blockchain network, such that a plurality of service nodes in the blockchain network, upon successful consensus verification of the credit addition transfer, establish a corresponding relationship between the node identifier and the copyright credit score increment and store the corresponding relationship in the blockchain.

The credit addition module 309 is configured to: if the originality representation value is greater than a third specified threshold, determine a second specified score as the copyright credit score increment, the third specified threshold being greater than the first specified threshold; if the originality representation value is not greater than the third specified threshold, determine a copyright credit score increment according to the originality representation value, wherein, if the originality representation value is not greater than the third specified threshold, the originality representation value is positively correlated with the determined copyright credit score increment, and the determined copyright credit score increment is less than the second specified score.

When the originality representation value is greater than the third specified threshold, the target work is an original work;

the credit addition module 309 is configured to: if the originality representation value is greater than the third specified threshold, before determining the second specified score as the copyright credit score increment, determine the quantity of published works corresponding to the target service node in the blockchain; if the quantity has reached a specified quantity, determine the proportion of original works in the works published by the target service node to the blockchain as an originality proportion; if the originality proportion is greater than a second specified proportion, determine a reward coefficient according to the originality proportion, the reward coefficient being not less than 1, the originality proportion being positively correlated with the reward coefficient; multiply the reward coefficient by the second specified score; determine the second specified score multiplied by the reward coefficient as the copyright credit score increment.

The credit addition module 309 is configured to: if the originality representation value is greater than the third specified threshold, after broadcasting the credit addition transfer to the blockchain network, monitor copyright earnings generated by the target work; if the monitored copyright earnings have reached a third specified amount, determine a supplementary copyright credit score increment corresponding to the copyright credit score increment according to the identified copyright earnings, the determined supplementary copyright credit score increment being positively correlated with the identified copyright earnings; construct a supplementary credit addition transfer on the basis of the node identifier and the determined supplementary copyright credit score increment; broadcast the supplementary credit addition transfer to the blockchain network, such that a plurality of service nodes in the blockchain network, upon successful consensus verification of the supplementary credit addition transfer, establish a corresponding relationship between the node identifier and the supplementary copyright credit score increment and store the corresponding relationship in the blockchain.

The credit addition module 309 is configured to: if the originality representation value is greater than the third specified threshold, after broadcasting the credit addition transfer to the blockchain network, for each of a plurality of specified periods, statistically collect copyright earnings generated by the target work within the specified period as copyright earnings corresponding to the specified period; average copyright earnings respectively corresponding to the plurality of specified periods to obtain average copyright earnings; if the average copyright earnings have reached a fourth specified amount, determine a supplementary copyright credit score increment corresponding to the copyright credit score increment according to the average copyright earnings, the determined supplementary copyright credit score increment being positively correlated with the average copyright earnings; construct a supplementary credit addition transfer on the basis of the node identifier and the determined supplementary copyright credit score increment; broadcast the supplementary credit addition transfer to the blockchain network, such that a plurality of service nodes in the blockchain network, upon successful consensus verification on the supplementary credit addition transfer, establish a corresponding relationship between the node identifier and the supplementary copyright credit score increment and store the corresponding relationship in the blockchain.

The device further includes a restriction module 310 configured to: when the copyright credit score corresponding to the target service node is lower than a preset score, perform a preset service restriction operation on the target service node.

The device further includes an adjustment module 311 configured to adjust a comprehensive credit score of the user corresponding to the target service node according to the copyright credit score corresponding to the target service node.

The adjustment module 311 is configured to: divide the copyright credit score corresponding to the target service node by the quantity of works published by the target service node to the blockchain, so as to obtain a corrected copyright credit score corresponding to the target service node; provide the corrected copyright credit score to a comprehensive credit evaluator, such that the comprehensive credit evaluator converts the corrected copyright credit score into a comprehensive credit reference score according to the corrected copyright credit score and a preset conversion rule, and adjusts the comprehensive credit score of the user corresponding to the target service node according to the comprehensive credit reference score.

An embodiment of the present application further provides a computer apparatus, which at least includes a memory, a processor and a computer program stored on the memory and capable of running on the processor, wherein the processor executes the program to implement the method illustrated in FIG. 1.

Figure 4:
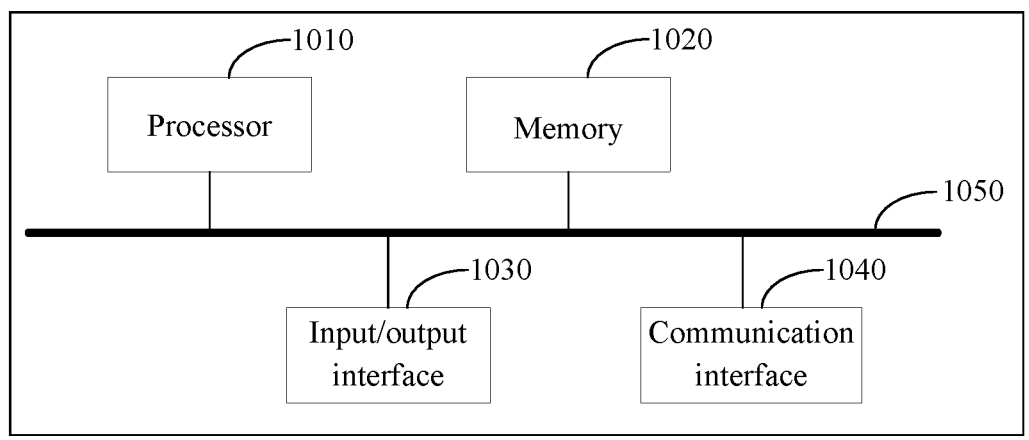
FIG. 4 is a structural schematic diagram of a computer apparatus for configuring the method provided by an embodiment of the present application.

FIG. 4 illustrates a structural schematic diagram of hardware of the more specific computer apparatus provided by an embodiment of the present application. The apparatus may include a process 1010, a memory 1020, an input/output interface 1030, a communication interface 1040, and a bus 1050. The processor 1010, the memory 1020, the input/output interface 1030 and the communication interface 1040 are communicatively connected with each other within the apparatus through the bus 1050.

The processor 1010 may be implemented by adopting a general-purpose CPU (Central Processing Unit), a microprocessor, an ASIC (Application Specific Integrated Circuit), or one or more integrated circuits, etc., for executing related programs to realize the technical solution provided by an embodiment of the present application.

The memory 1020 may be implemented by adopting an ROM (Read Only Memory), an RAM (Random Access Memory), a static memory device, a dynamic memory device, etc. The memory 1020 may store an operating system and other application programs. When the technical solution provided by an embodiment of the present application is implemented by means of software or firmware, relevant program codes are stored in the memory 1020 and are called and executed by the processor 1010.

The input/output interface 1030 is used to connect with an input/output module for information input and output. The input/output module may be configured as a component in an apparatus (not shown), or may be externally connected to an apparatus to provide corresponding functions. Input apparatuses may include keyboards, mice, touch screens, microphones, various sensors, etc. Output apparatuses may include displays, speakers, vibrators, indicator lights, etc.

The communication interface 1040 is used to connect with a communication module (not shown) to realize the communication interaction between the apparatus and other apparatuses. The communication module may realize communication through a wired mode (for example, USB, network cable, etc.), and may also realize communication through a wireless mode (for example, mobile network, WiFi, Bluetooth, etc.).

The bus 1050 includes a path to transmit information between various components of the apparatus, such as the processor 1010, the memory 1020, the input/output interface 1030, and the communication interface 1040.

It should be noted that, although the processor 1010, the memory 1020, the input/output interface 1030, the communication interface 1040 and the bus 1050 of the apparatus are illustrated only, in the specific implementation process, the apparatus may further include other components necessary for normal operation. In addition, those skilled in the art can understand that the apparatus may only include components necessary to realize the technical solution provided by an embodiment of the present application, and does not necessarily include all components illustrated in the drawings.

An embodiment of the present application further provides a computer-readable storage medium on which a computer program is stored, and the program is executed by the processor to implement the method illustrated in FIG. 1.

The computer-readable medium includes permanent and non-permanent, movable and non-movable media that can achieve information storage by means of any methods or techniques. The information may be computer-readable instructions, data structures, modules of programs or other data. Examples of a storage medium of a computer include, but are not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible by a computing device. According to the definitions herein, the computer-readable medium does not include transitory computer-readable media (transitory media), such as a modulated data signal and a carrier wave.

From the description of the above embodiment, it can be seen that those skilled in the art can clearly understand that an embodiment of the present application can be implemented by means of software and a necessary general-purpose hardware platform. Based on such understanding, the technical solution provided by an embodiment of the present application or the part that contributes to the prior art may be embodied in the form of a software product. The computer software product may be stored in a storage medium, such as ROM/RAM, disk, optical disk, etc., and include several instructions used to enable a computer apparatus (which may be a personal computer, a server, a network apparatus, or the like) to execute the method described in each embodiment or some parts of each embodiment of the present application.

The system, method, module, or unit illustrated in the embodiments may be specifically implemented by a computer chip or an entity, or a product having a certain function. A typical implementation device is a computer, the specific form of a computer may be a personal computer, a laptop computer, a cellular telephone, a camera phone, a smartphone, a personal digital assistant, a media player, a navigation device, an email transceiver device, a gaming console, a tablet computer, a wearable device, or a combination of any of these devices.

Each embodiment of the present application is described in a progressive manner, and the same or similar sections between various embodiments are described with reference to each other, each of which is focused on the differences from other embodiments. In particular, for a device or apparatus embodiment, as it is substantially similar to the method embodiment, the description is simpler, and for the relevant part, a reference may be made to the part of the description of the method embodiment. The method embodiment described above is only exemplary, in which the modules described as discrete components may or may not be physically separated, and the functions of each module may be realized in the same or different software and/or hardware when the technical solution provided by an embodiment of the present application is implemented. Some or all modules may be selected to realize the purpose of the technical solution provided by the embodiment according to the actual needs. Those skilled in the art can understand and implement the present application without contributing any inventive labor.

What is described above is only the specific implementation mode of an embodiment of the present application. It should be pointed out that, with departing from the principle of an embodiment of the present application, those skilled in the art may make various improvements and modifications, which, however, should be regarded as included in the scope of protection of the present application.

What is claimed is:

1. A method of performing credit evaluation, the method comprising:
    deploying a blockchain network including a plurality of service nodes, each service node having permission to publish works to the blockchain network each service node of the plurality of service nodes being assigned a copyright credit score coefficient based on a historical performance of the service node in publishing works with degrees of originality to the blockchain network;
    performing, by a respective service node in the blockchain network, an originality analysis, according to published works in the blockchain, on a target work published by a target service node to the blockchain network so as to obtain an originality representation value corresponding to the target work, wherein the target service node is any service node, and wherein the originality representation value is positively correlated with a degree of originality of the target work;
    comparing the originality representation value to a first specified threshold and determining a copyright credit score decrement or increment based on an outcome of the comparison and the originality representation value, and based on a copyright credit score coefficient of the target service node;
    constructing a credit deduction or addition transfer based on a node identifier of the target service node and the copyright credit score decrement or increment, respectively; and
    broadcasting, by the respective service node, the credit deduction or addition transfer to the blockchain network, such that a plurality of service nodes in the blockchain network, upon successful consensus verification of the credit deduction or addition transfer, establish a corresponding relationship between the node identifier and the copyright credit score decrement or increment, respectively, and store the corresponding relationship in a blockchain,
    wherein a copyright credit score corresponding to the target service node is positively correlated with credit evaluation of a user corresponding to the target service node.

2. The method according to claim 1, wherein the originality representation value is less than the first specified threshold, wherein determining the copyright credit score decrement specifically comprises:
    if the originality representation value is less than a second specified threshold, determining a first specified score as the copyright credit score decrement, the second specified threshold being less than the first specified threshold; and
    if the originality representation value is not less than the second specified threshold, determining the copyright credit score decrement according to the originality representation value,
    wherein if the originality representation value is not less than the second specified threshold, the originality representation value is negatively correlated with the determined copyright credit score decrement, and the determined copyright credit score decrement is less than the first specified score.

3. The method according to claim 2, wherein: the copyright credit score coefficient of the target service node includes a punishment coefficient;
    if the originality representation value is less than the second specified threshold, the target work is a plagiarized work;
    if the originality representation value is less than the second specified threshold, before determining the first specified score as the copyright credit score decrement, the method further comprises:
    determining a quantity of published works corresponding to the target service node in the blockchain;
    if the quantity has reached a specified quantity, determining a proportion of plagiarized works in the works published by the target service node to the blockchain as a plagiarism proportion; and
    if the plagiarism proportion is greater than a first specified proportion, determining the punishment coefficient of the target service node according to the plagiarism proportion, wherein the punishment coefficient is not less than 1, and the plagiarism proportion is positively correlated with the punishment coefficient; and
    the determining the first specified score as the copyright credit score decrement corresponding to the target service node specifically comprises:
    multiplying the punishment coefficient by the first specified score; and
    determining the first specified score multiplied by the punishment coefficient as the copyright credit score decrement.

4. The method according to claim 2, wherein, if the originality representation value is less than the second specified threshold, after broadcasting the credit deduction transfer to the blockchain network, the method further comprises:
    identifying copyright earnings generated by the target work;
    if the identified copyright earnings have reached a first specified amount, determining a supplementary copyright credit score decrement corresponding to the copyright credit score decrement according to the identified copyright earnings, the determined supplementary copyright credit score decrement being positively correlated with the identified copyright earnings;
    constructing a supplementary credit deduction transfer on the basis of the node identifier and the determined supplementary copyright credit score decrement; and
    broadcasting the supplementary credit deduction transfer to the blockchain network, such that a plurality of service nodes in the blockchain network, upon successful consensus verification of the supplementary copyright credit deduction transfer, establish a corresponding relationship between the node identifier and the determined supplementary copyright credit score decrement, and store the corresponding relationship in the blockchain.

5. The method according to claim 2, wherein after broadcasting the credit deduction transfer to the blockchain network if the originality representation value is less than the second specified threshold, the method further comprises:
for each of a plurality of specified periods, statistically collecting copyright earnings generated by the target work within the specified period as copyright earnings corresponding to the specified period;
averaging copyright earnings respectively corresponding to the plurality of specified periods to obtain average copyright earnings;
if the average copyright earnings have reached a second specified amount, determining a supplementary copyright credit score decrement corresponding to the copyright credit score decrement according to the average copyright earnings, the determined supplementary copyright credit score decrement being positively correlated with the average copyright earnings;
constructing a supplementary credit deduction transfer on the basis of the node identifier and the determined supplementary copyright credit score decrement; and
broadcasting the supplementary credit deduction transfer to the blockchain network, such that a plurality of service nodes in the blockchain network, upon successful consensus verification of the supplementary credit deduction transfer, establish a corresponding relationship between the node identifier and the determined supplementary copyright credit score decrement and store the corresponding relationship in the blockchain.

6. The method according to claim 2, wherein if the originality representation value is less than the second specified threshold, the target work is a plagiarized work; and
if the originality representation value is less than the second specified threshold, after broadcasting the credit deduction transfer to the blockchain network the method further comprises:
identifying copyright earnings generated by an original work plagiarized by the target work;
determining a supplementary copyright credit score decrement corresponding to the copyright credit score decrement according to the identified copyright earnings, the determined supplementary copyright credit score decrement being positively or negatively correlated with the identified copyright earnings;
creating a supplementary credit deduction transfer on the basis of the node identifier and the determined supplementary copyright credit score decrement;
broadcasting the supplementary credit deduction transfer to the blockchain network, such that a plurality of service nodes in the blockchain network, upon successful consensus verification on the supplementary credit deduction transfer, establish a corresponding relationship between the node identifier and the determined supplementary copyright credit score decrement and store the corresponding relationship in the blockchain.

7. The method according to claim 1, wherein the originality representation value is greater than the first specified threshold, wherein determining the copyright credit score increment according to the originality representation value specifically comprises:
if the originality representation value is greater than a third specified threshold, determining a second specified score as the copyright credit score increment, the third specified threshold being greater than the first specified threshold; and
if the originality representation value is not greater than the third specified threshold, determining the copyright credit score increment according to the originality representation value,
wherein if the originality representation value is not greater than the third specified threshold, the originality representation value is positively correlated with the determined copyright credit score increment, and the determined copyright credit score increment is less than the second specified score.

8. The method according to claim 7, wherein: if the originality representation value is greater than the third specified threshold, the target work is an original work; and
if the originality representation value is greater than the third specified threshold, before determining the second specified score as the copyright credit score increment, the method further comprises:
determining a quantity of published works corresponding to the target service node in the blockchain;
if the quantity has reached a specified quantity, determining a proportion of original works in the works published by the target service node to the blockchain as an originality proportion; and
if the originality proportion is greater than a second specified proportion, determining a reward coefficient according to the originality proportion, the reward coefficient being not less than 1, the originality proportion being positively correlated with the reward coefficient;
the determining the second specified score as the copyright credit score increment corresponding to the target service node specifically comprises:
multiplying the reward coefficient by the second specified score; and
determining the second specified score multiplied by the reward coefficient as the copyright credit score increment.

9. The method according to claim 7, wherein, if the originality representation value is greater than the third specified threshold, after broadcasting the credit addition transfer to the blockchain network, the method further comprises:
identifying copyright earnings generated by the target work;
if the identified copyright earnings have reached a third specified amount, determining a supplementary copyright credit score increment corresponding to the copyright credit score increment according to the identified copyright earnings, the determined supplementary copyright credit score increment being positively correlated with the identified copyright earnings;
constructing a supplementary credit addition transfer on the basis of the node identifier and the determined supplementary copyright credit score increment; and
broadcasting the supplementary credit addition transfer to the blockchain network, such that a plurality of service nodes in the blockchain network, upon successful consensus verification of the supplementary credit addition transfer, establish a corresponding relationship between the node identifier and the supplementary copyright credit score increment and store the corresponding relationship in the blockchain.

10. The method according to claim 7, wherein, if the originality representation value is greater than the third specified threshold, after broadcasting the credit addition transfer to the blockchain network, the method further comprises:

for each of a plurality of specified periods, statistically collecting copyright earnings generated by the target work within the specified period as copyright earnings corresponding to the specified period;
averaging copyright earnings respectively corresponding to the plurality of specified periods to obtain average copyright earnings;
if the average copyright earnings have reached a fourth specified amount, determining a supplementary copyright credit score increment corresponding to the copyright credit score increment according to the average copyright earnings, the determined supplementary copyright credit score increment being positively correlated with the average copyright earnings;
constructing a supplementary credit addition transfer on the basis of the node identifier and the determined supplementary copyright credit score increment; and
broadcasting the supplementary credit addition transfer to the blockchain network, such that a plurality of service nodes in the blockchain network, upon successful consensus verification of the supplementary credit addition transfer, establish a corresponding relationship between the node identifier and the supplementary copyright credit score increment, and store the corresponding relationship in the blockchain.

11. The method according to claim 1, wherein the method further comprises:
when the copyright credit score corresponding to the target service node is lower than a preset score, performing a preset service restriction operation on the target service node.

12. The method according to claim 1, wherein the method further comprises:
adjusting a comprehensive credit score of the user corresponding to the target service node according to the copyright credit score corresponding to the target service node.

13. The method according to claim 12, wherein adjusting a comprehensive credit score of the user corresponding to the target service node according to the copyright credit score corresponding to the target service node specifically comprises:
dividing the copyright credit score corresponding to the target service node by a quantity of works published by the target service node to the blockchain, so as to obtain a corrected copyright credit score corresponding to the target service node; and
providing the corrected copyright credit score to a comprehensive credit evaluator, such that the comprehensive credit evaluator converts the corrected copyright credit score into a comprehensive credit reference score according to the corrected copyright credit score and a preset conversion rule, and adjusts the comprehensive credit score of the user corresponding to the target service node according to the comprehensive credit reference score.

14. A device for performing credit evaluation on a work publisher associated with a blockchain network comprising a plurality of service nodes, each service node having permission to publish works to the blockchain, the device comprising:
an originality analysis module configured to perform, by a respective service node in the blockchain network, originality analysis, according to published works in the blockchain, on a target work published by a target service node to the blockchain, so as to obtain an originality representation value corresponding to the target work, wherein the target service node is any service node, and the originality representation value is positively correlated with a degree of originality of the target work;
a determination module configured to compare the originality representation value to a first specified threshold and determine a copyright credit score decrement or increment based on an outcome of the comparison and the originality representation value and based on a copyright credit score coefficient of the target service node, wherein the copyright credit score coefficient is determined based on a historical performance of the service node in publishing works with degrees of originality to the blockchain network;
a credit transfer creation module configured to create a credit deduction or addition transfer on the basis of a node identifier of the target service node and the copyright credit score decrement or increment, respectively;
a credit transfer broadcasting module configured to broadcast, by the respective service node, the credit deduction or addition transfer to the blockchain network, such that a plurality of service nodes in the blockchain network, upon successful consensus verification of the credit deduction or addition transfer, establish a corresponding relationship between the node identifier and the copyright credit score decrement or increment, respectively, and store the corresponding relationship in a blockchain; and
wherein a copyright credit score corresponding to the target service node is positively correlated with credit evaluation of a user corresponding to the target service node.

15. The device according to claim 14, wherein the originality representation value is less than the first specified threshold, wherein the determination module is configured to:
if the originality representation value is less than a second specified threshold, determine a first specified score as the copyright credit score decrement, the second specified threshold being less than the first specified threshold; and
if the originality representation value is not less than the second specified threshold, determine the copyright credit score decrement according to the originality representation value, wherein, if the originality representation value is not less than the second specified threshold, the originality representation value is negatively correlated with the determined copyright credit score decrement, and the determined copyright credit score decrement is less than the first specified score.

16. The device according to claim 15, wherein:
the copyright credit score coefficient of the target service node includes a punishment coefficient;
if the originality representation value is less than the second specified threshold, the target work is a plagiarized work; and
the device further comprises a punishment coefficient determination module configured to:
if the originality representation value is less than the second specified threshold, before determining the first specified score as the copyright credit score decrement, determine a quantity of published works corresponding to the target service node in the blockchain;
if the quantity has reached a specified quantity, determine a proportion of plagiarized works in the works published by the target service node to the blockchain as a plagiarism proportion;
if the plagiarism proportion is greater than a first specified proportion, determine a punishment coefficient of the target service node according to the plagiarism proportion, the punishment coefficient being not less than 1, the plagiarism proportion being positively correlated with the punishment coefficient; and the determination module is configured to:
multiply the punishment coefficient by the first specified score; and
determine the first specified score multiplied by the punishment coefficient as the copyright credit score decrement.

17. The device according to claim 15, wherein the device further comprises a first supplementary deduction module configured to:
if the originality representation value is less than the second specified threshold, after broadcasting the credit deduction transfer to the blockchain network, identify copyright earnings generated by the target work;
if the identified copyright earnings have reached a first specified amount, determine a supplementary copyright credit score decrement corresponding to the copyright credit score decrement according to the identified copyright earnings, the determined supplementary copyright credit score decrement being positively correlated with the identified copyright earnings;
construct a supplementary credit deduction transfer on the basis of the node identifier and the determined supplementary copyright credit score decrement; and
broadcast the supplementary credit deduction transfer to the blockchain network, such that a plurality of service nodes in the blockchain network, upon successful consensus verification of the supplementary credit deduction transfer, establish a corresponding relationship between the node identifier and the determined supplementary copyright credit score decrement, and store the corresponding relationship in the blockchain.

18. The device according to claim 15, wherein the device further comprises a second supplementary deduction module configured to:
if the originality representation value is less than the second specified threshold, after broadcasting the credit deduction transfer to the blockchain network, for each of a plurality of specified periods, statistically collect copyright earnings generated by the target work within the specified period as copyright earnings corresponding to the specified period;
average copyright earnings respectively corresponding to the plurality of specified periods to obtain average copyright earnings;
if the average copyright earnings have reached a second specified amount, determine a supplementary copyright credit score decrement corresponding to the copyright credit score decrement according to the average copyright earnings, the determined supplementary copyright credit score decrement being positively correlated with the average copyright earnings;
construct a supplementary credit deduction transfer on the basis of the node identifier and the determined supplementary copyright credit score decrement; and
broadcast the supplementary credit deduction transfer to the blockchain network, such that a plurality of service nodes in the blockchain network, upon successful consensus verification of the supplementary credit deduction transfer, establish a corresponding relationship between the node identifier and the determined supplementary copyright credit score decrement and store the corresponding relationship in the blockchain.

19. The device according to claim 15, wherein, if the originality representation value is less than the second specified threshold, the target work is a plagiarized work;
the device further comprises a third supplementary deduction module configured to:
if the originality representation value is less than the second specified threshold, after broadcasting the credit deduction transfer to the blockchain network, identify copyright earnings generated by an original work plagiarized by the target work;
determine a supplementary copyright credit score decrement corresponding to the copyright credit score decrement according to the identified copyright earnings, the determined supplementary copyright credit score decrement being positively or negatively correlated with the identified copyright earnings;
construct a supplementary credit deduction transfer on the basis of the node identifier and the determined supplementary copyright credit score decrement; and
broadcast the supplementary credit deduction transfer to the blockchain network, such that a plurality of service nodes in the blockchain network, upon successful consensus verification of the supplementary credit deduction transfer, establish a corresponding relationship between the node identifier and the determined supplementary copyright credit score decrement and store the corresponding relationship in the blockchain.

20. The device according to claim 14, wherein:
the originality representation value is greater than the first specified threshold, wherein the credit addition module is configured to:
if the originality representation value is greater than a third specified threshold, determine a second specified score as the copyright credit score increment, the third specified threshold being greater than the first specified threshold; and
if the originality representation value is not greater than the third specified threshold, determine the copyright credit score increment according to the originality representation value, wherein, if the originality representation value is not greater than the third specified threshold, the originality representation value is positively correlated with the determined copyright credit score increment, and the determined copyright credit score increment is less than the second specified score.

21. The device according to claim 20, wherein, if the originality representation value is greater than the third specified threshold, the target work is an original work;
the credit addition module is configured to:
if the originality representation value is greater than the third specified threshold, before determining the second specified score as the copyright credit score increment, determine a quantity of published works corresponding to the target service node in the blockchain;
if the quantity has reached a specified quantity, determine a proportion of original works in the works published by the target service node to the blockchain as an originality proportion;
if the originality proportion is greater than a second specified proportion, determine a reward coefficient according to the originality proportion, the reward coefficient being not less than 1, the originality proportion being positively correlated with the reward coefficient;

multiply the reward coefficient by the second specified score; and determine the second specified score multiplied by the reward coefficient as the copyright credit score increment.

22. The device according to claim 20, wherein the credit addition module is configured to:

if the originality representation value is greater than the third specified threshold, after broadcasting the credit addition transfer to the blockchain network, identify copyright earnings generated by the target work;

if the identified copyright earnings have reached a third specified amount, determine a supplementary copyright credit score increment corresponding to the copyright credit score increment according to the identified copyright earnings, the determined supplementary copyright credit score increment being positively correlated with the identified copyright earnings;

construct a supplementary credit addition transfer on the basis of the node identifier and the determined supplementary copyright credit score increment; and broadcast the supplementary credit addition transfer to the blockchain network, such that a plurality of service nodes in the blockchain network, upon successful consensus verification of the supplementary credit addition transfer, establish a corresponding relationship between the node identifier and the supplementary copyright credit score increment, and store the corresponding relationship in the blockchain.

23. The device according to claim 20, wherein the credit addition module is configured to:

if the originality representation value is greater than the third specified threshold, after broadcasting the credit addition transfer to the blockchain network, for each of a plurality of specified periods, statistically collect copyright earnings generated by the target work within the specified period as copyright earnings corresponding to the specified period;

average copyright earnings respectively corresponding to the plurality of specified periods to obtain average copyright earnings;

if the average copyright earnings have reached a fourth specified amount, determine a supplementary copyright credit score increment corresponding to a copyright credit score increment according to the average copyright earnings, the determined supplementary copyright credit score increment being positively correlated with the average copyright earnings;

construct a supplementary credit addition transfer on the basis of the node identifier and the determined supplementary copyright credit score increment; and broadcast the supplementary credit addition transfer to the blockchain network, such that a plurality of service nodes in the blockchain network, upon successful consensus verification of the supplementary credit addition transfer, establish a corresponding relationship between the node identifier and the supplementary copyright credit score increment, and store the corresponding relationship in the blockchain.

24. The device according to claim 14, wherein the device further comprises:

a restriction module configured to: when the copyright credit score corresponding to the target service node is lower than a preset score, perform a preset service restriction operation on the target service node.

25. The device according to claim 14, wherein the device further comprises:

an adjustment module configured to adjust a comprehensive credit score of the user corresponding to the target service node according to the copyright credit score corresponding to the target service node.

26. The device according to claim 25, wherein the adjustment module is configured to:

divide the copyright credit score corresponding to the target service node by a quantity of works published by the target service node to the blockchain, so as to obtain a corrected copyright credit score corresponding to the target service node; and provide the corrected copyright credit score to a comprehensive credit evaluator, such that the comprehensive credit evaluator converts the corrected copyright credit score into a comprehensive credit reference score according to the corrected copyright credit score and a preset conversion rule, and adjusts the comprehensive credit score of the user corresponding to the target service node according to the comprehensive credit reference score.

27. A computer apparatus, comprising a memory, a processor, and a computer program stored on the memory and executable by the processor, wherein the processor executes the program to perform a acts of performing credit evaluation, the acts comprising:

deploying a blockchain network including a plurality of service nodes each service node having permission to publish works to the blockchain network, each service node of the plurality of service nodes being assigned a copyright credit score coefficient based on a historical performance of the service node in publishing works with degrees of originality to the blockchain network;

performing, by a respective service node in the blockchain network, originality analysis, according to published works in the blockchain, on a target work published by a target service node to the blockchain network, so as to obtain an originality representation value corresponding to the target work, wherein the target service node is any service node, and wherein the originality representation value is positively correlated with a degree of originality of the target work;

comparing the originality representation value to a first specified threshold and determining a copyright credit score decrement or increment based on an outcome of the comparison and the originality representation value;

constructing a credit deduction or addition transfer based on a node identified of the target service node and the copyright credit score decrement or increment, respectively;

broadcasting, by the respective node, the credit deduction or addition transfer to the blockchain network, such that a plurality of service nodes in the blockchain network, upon successful consensus verification of the credit deduction or addition transfer, establish a corresponding relationship between the node identifier and the copyright credit score decrement or increment, respectively, and store the corresponding relationship in a blockchain; and wherein a copyright credit score corresponding to the target service node is positively correlated with credit evaluation of a user corresponding to the target service node.

* * * * *

UNITED STATES PATENT AND TRADEMARK OFFICE
CERTIFICATE OF CORRECTION

PATENT NO. : 11,948,155 B2  
APPLICATION NO. : 17/254159  
DATED : April 2, 2024  
INVENTOR(S) : Xinying Yang Page 1 of 1

It is certified that error appears in the above-identified patent and that said Letters Patent is hereby corrected as shown below:

In the Claims

Column 23, Claim 1, Line 21:
"blockchain network each service"
Should read:
--blockchain network, each service--.

Column 25, Claim 6, Line 49:
"credit score decrement;"
Should read:
--credit score decrement; and--.

Column 26, Claim 8, Line 29:
"coefficient;"
Should read:
--coefficient,--.

Signed and Sealed this  
Sixth Day of August, 2024

Katherine Kelly Vidal  
*Director of the United States Patent and Trademark Office*